F. B. MORSE.
Thill-Coupling.
No. 47,154. Patented Apr. 4, 1865.
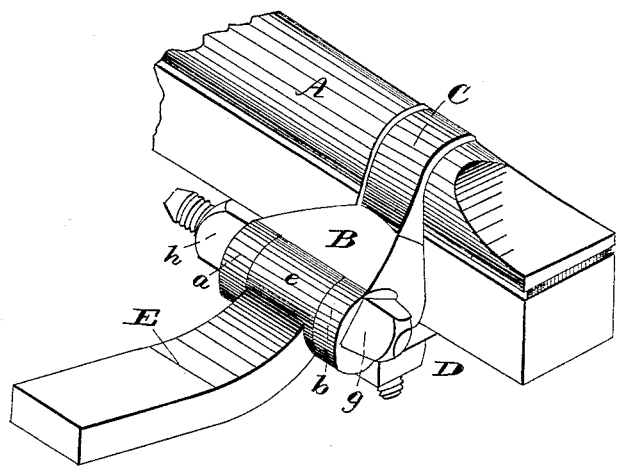
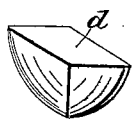
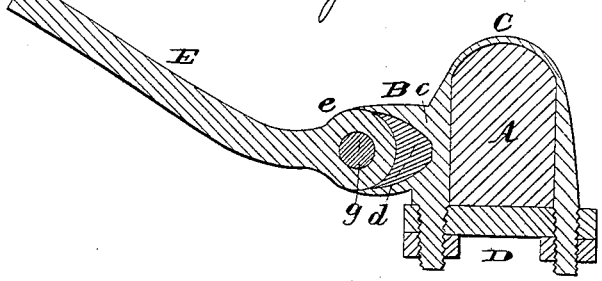
Witnesses
Henry E. Bowns
R. Fitzgerald
Inventor
F. B. Morse

UNITED STATES PATENT OFFICE.

FRANCIS B. MORSE, OF NEW HAVEN, CONNECTICUT, ASSIGNOR TO FREDERICK C. DAYTON, JR.

IMPROVEMENT IN SHAFT-COUPLINGS FOR CARRIAGES.

Specification forming part of Letters Patent No. 47,154, dated April 14, 1865.

*To all whom it may concern:*

Be it known that I, FRANCIS B. MORSE, of the city and county of New Haven, and State of Connecticut, have invented a new and useful Improvement in Shaft-Couplings for Carriages, as a new article of manufacture; and I do hereby declare that the following is a full, clear, and exact description of the construction, character, and operation of the same, reference being had to the accompanying drawings, which make part of this specification, in which—

Figure 1 is a perspective view of the coupling for one shaft complete. Fig. 2 is a section of the same cut vertically through the axle, draft-clip, tie, and joint of the coupling, showing the cavity with the presser in it. Fig. 3 is a perspective view of the elastic presser.

My improvement consists in making the jack or stationary part of the coupling or joint with two eyes and a cavity opening forward or toward the head or movable part of the joint or coupling, to receive a piece of india-rubber, or any other suitably elastic presser, to press against the movable part of the joint, so as to obviate all rattling.

I make the draft-clip C and tie D in the usual way, and fit them onto the axle A in the usual way, all as shown in Fig. 1. I make the jack or stationary part B of the joint or coupling of the same piece of iron as the draft-clip C, and projecting from the front side, as shown at B, Figs. 1 and 2, and forge or swage it with two eyes, as shown at $a$ and $b$, Fig. 1, and with a cavity, $c$, between and in rear of the two eyes, suitable to receive an elastic presser, $d$, all as seen in section in Fig. 2. By this manner of swaging or forging I swell this stationary part of the joint to the symmetrical form shown in Fig. 1, and completely finish the inside of the two eyes ready to receive the head or movable part of the joint, while the outside will only need to be filed smooth, and when the eyes are drilled it is ready for use. I make the head E or movable part of the joint or coupling of a piece of iron of a suitable thickness to be convenient for making the single eye $e$ of the joint; and I forge or swage the eye to fit the stationary (or two-eyed) part before described, so that it will only need to be filed smooth and the eye drilled to be fitted for its place in the jack or stationary part. I make the elastic presser, Fig. 3, of india-rubber, or any other suitable elastic substance, of a suitable size and shape to fit the cavity $c$ in the jack or stationary parts, as indicated in section at $d$, Fig. 2. I make the bolt $g$ and nut $h$ in the usual way.

Having made the several parts as before described, I place the elastic presser, Fig. 3, in the cavity $c$, Fig. 2, insert the single eye $e$ of the head or movable part of the joint E between the two eyes $a$ and $b$ of the jack or stationary part B, put in the bolt $g$, and turn on the nut $h$, when the whole will be complete as an anti-rattling coupling, as shown in Fig. 1.

This coupling is equally suited for attaching poles to carriages.

The advantages of my improvement consist in that it can be constructed at less than half of the expense of the coupling for which I received a patent dated February 9, 1864, and can be made somewhat lighter, and yet serve all the purposes of an anti-rattling coupling in many cases nearly as well and in some cases it will be equal to it and in that the joint or coupling can be forged and finished by any blacksmith, with very little (if any) additional expense for tools, while the other requires a milling-machine to finish the jack or stationary part, which requires accurate milling to fit the shoulders, and in that when both shafts and a pole are used with the same carriage, (as is generally the case,) the additions in the present case are only the two plain pieces, having only one eye, and of the simplest kind of forging and finishing, and are always convenient for being bent when cold to suit the curves of the shafts, while in my patent before named the additional parts are those which contain the cavities, pressers, &c., and those which are most expensive, and should only be bent when hot, as otherwise there would be danger of injuring the cavities.

I am aware that elastic pressers have long been used to obviate the rattling of carriage-couplings, and that a cavity to receive and retain such pressers is not now new, (as it is found in the head in my patent of February 9, 1864. I therefore do not claim either of them as such as my present invention; but

What I claim as my invention, and desire to secure by Letters Patent as a new article of manufacture, is—

A shaft-coupling composed of a jack or stationary part forged with two eyes, and a cavity for retaining an elastic presser, an elastic presser, and a plain head with one eye, when constructed, combined, and fitted for use substantially as herein described.

F. B. MORSE.

Witnesses:
  HENRY E. BOWNS,
  R. FITZGERALD.